(12) United States Patent
Graumann et al.

(10) Patent No.: US 9,501,182 B2
(45) Date of Patent: Nov. 22, 2016

(54) MECHANISM FOR INTERPRETING TOUCHES TO A PAD COVER OVER A SENSOR PAD AT A COMPUTING DEVICE

(75) Inventors: David L. Graumann, Portland, OR (US); Lakshman Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 13/977,680

(22) PCT Filed: Sep. 30, 2011

(86) PCT No.: PCT/US2011/054431
§ 371 (c)(1),
(2), (4) Date: Jun. 29, 2013

(87) PCT Pub. No.: WO2013/048498
PCT Pub. Date: Apr. 4, 2013

(65) Prior Publication Data
US 2013/0285982 A1    Oct. 31, 2013

(51) Int. Cl.
*G06F 3/045* (2006.01)
*G06F 3/044* (2006.01)
(Continued)

(52) U.S. Cl.
CPC ............ *G06F 3/044* (2013.01); *G06F 1/169* (2013.01); *G06F 3/03547* (2013.01); *G06F 3/0414* (2013.01); *G06F 3/0485* (2013.01); *G06F 3/04883* (2013.01); *G06F 2203/0339* (2013.01)

(58) Field of Classification Search
None
See application file for complete search history.

(56) References Cited

U.S. PATENT DOCUMENTS

2005/0110769 A1    5/2005   DaCosta et al.
2010/0315337 A1*  12/2010   Ferren ................ G06F 1/169
                                                       345/158
(Continued)

FOREIGN PATENT DOCUMENTS

CN         100385377           4/2008
CN         100570597 C         12/2009
(Continued)

OTHER PUBLICATIONS

PCT/US2011/054431, Notification of Transmittal of the International Search Report and the Written Opinion of the of the International Searching Authority, or the Declaration, mailed May 17, 2012, 9 pgs.

(Continued)

*Primary Examiner* — Joseph Haley
*Assistant Examiner* — Ifedayo Iluyomade
(74) *Attorney, Agent, or Firm* — Blakely, Sokoloff, Taylor & Zafman LLP

(57) ABSTRACT

A mechanism is described for interpreting touches to a pad cover placed over a sensor external to a computing device. A method of embodiments of the invention includes sensing a touch on a pad cover covering a capacitive sensor of a computing device. The sensing may include determining a capacitive intensity that corresponds to an amount of pressure applied to the pad cover via the touch. The method may further include interpreting the capacitive intensity as measured by the capacitive sensor across a pad cover gap to determine the amount of pressure applied to the pad cover, determining user intent based on the interpreted capacitive intensity and the determined corresponding amount of applied pressure relating to the touch, and facilitating an action in accordance with the user intent.

15 Claims, 6 Drawing Sheets

(51) Int. Cl.
  *G06F 1/16*    (2006.01)
  *G06F 3/0485*  (2013.01)
  *G06F 3/0488*  (2013.01)
  *G06F 3/0354*  (2013.01)
  *G06F 3/041*   (2006.01)

(56) References Cited

U.S. PATENT DOCUMENTS

2010/0315356 A1* 12/2010 Ferren .................... G06F 1/169
                                                      345/173
2010/0315536 A1   12/2010 Wang
2011/0141053 A1    6/2011 Bulea et al.
2012/0146935 A1*  6/2012 Bulea .................. G06F 3/03547
                                                      345/174

FOREIGN PATENT DOCUMENTS

KR  10-2009-0084636   8/2009
KR  10-2010-0035475   4/2010
KR  10-2011-0017239   2/2011

OTHER PUBLICATIONS

European Patent Application, 11873028.2 Extended European Search Report, Mailed Apr. 30, 2015, 6 pages.
First Office Action and Search Report China Application No. 201180075122.1, mailed Jan. 18, 2016, 6 pages.

* cited by examiner

MECHANISM FOR INTERPRETING TOUCHES TO A PAD COVER OVER A SENSOR PAD AT A COMPUTING DEVICE

CROSS-REFERENCE TO RELATED APPLICATION

This patent application is a U.S. National Phase Application under 35 U.S.C. §371 of International Application No. PCT/US2011/054431, filed Sep. 30, 2011, entitled MECHANISM FOR INTERPRETING TOUCHES TO A PAD COVER OVER A SENSOR PAD AT A COMPUTING DEVICE.

FIELD

The field relates generally to computing devices and, more particularly, to employing a mechanism for interpreting touch to a pad cover placed over a sensor pad external to a computing device.

BACKGROUND

With the increase in the use of mobile device, it is getting increasingly important to make these devices easy to use (e.g., using touch panels) but without having to increase the cost, size or complexity and/or reduce value, efficiency or existing features. None of the current technologies satisfy the aforementioned standards. For example, one way to increase touch panel sensitivity or functionality is to add a number of extra components to the device (e.g., a microcontroller, Central Processing Unit (CPU) drivers, cables or connectors, etc.) which results in increased cost, size, complexity, etc. Further, with additional functionalities, computing devices are getting increasingly complex and large in size and difficult to operate.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for interpreting touches to a pad cover placed over a sensor external to a computing device. A method of embodiments of the invention includes sensing a touch on a pad cover covering a capacitive sensor of a computing device. The sensing may include determining a capacitive intensity that corresponds to an amount of pressure applied to the pad cover via the touch. The method may further include interpreting the capacitive intensity as measured by the capacitive sensor across a pad cover gap to determine the amount of pressure applied to the pad cover, determining user intent based on the interpreted capacitive intensity and the determined corresponding amount of applied pressure relating to the touch, and facilitating an action in accordance with the user intent.

In one embodiment, a capacitive touch sensor pad cover ("pad cover") is employed at a computing device (e.g., a mobile computing device, such as a smartphone) to provide an efficient and affordable covering for a sensor or sensor pad (e.g., thumb sensor pad) provided on the side (e.g., right or left side) of the computing device to be operated by a human thumb or finger, etc. The pad cover, in one embodiment, provides an appropriate cover that is not only properly designed to prevent the sensor pad from a direct human touch which can eventually decay the sensor pad, but also intelligent enough to sense and distinguish various human touches, such as a tap, a flick, a press, a rub, a scroll, etc. For example, the pad cover's ability to distinguish a tap from a short flick makes the sensor pad react naturally and allow the user to select and activate objects on the computing device, such as on the touch or display panel of a smartphone. Further, the pad cover is designed to entirely cover the sensor pad wherever it is located on the computing device.

Figure 1:
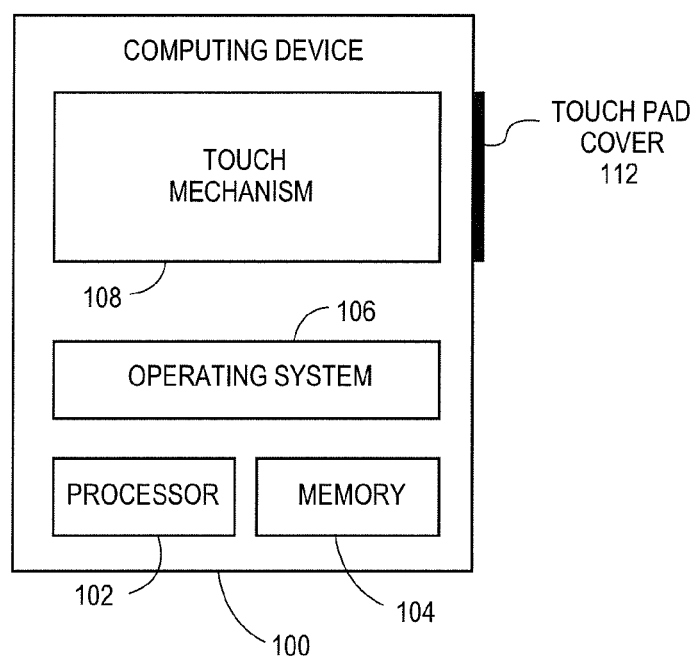
FIG. 1 illustrate a computing device hosting a touch mechanism to interpret touch to a pad cover placed over a sensor pad of the computing device according to one embodiment of the invention.

FIG. 1 illustrates a computing device 100 hosting a touch mechanism 108 to interpret touch to a pad cover 112 placed over a sensor pad of the computing device 100 according to one embodiment of the invention. Computing device 100 includes a mobile computing device, such as a smartphone (e.g., iPhone®, BlackBerry®, etc.), a handheld computing device, a personal digital assistant (PDA), a tablet computer (e.g., iPad®, Samsung® Galaxy Tab®, etc.), a laptop computer (e.g., notebooks, netbooks, etc.), and other similar mobile computing devices, etc., having a touchscreen or touch panel having a virtual keyboard, etc., serving as a source of input. Computing device 100 further includes an operating system 106 serving as an interface between any hardware or physical resources of the computer device 100 and a user. Computing device 100 may further include one or more processors 102, memory devices 104, network devices, drivers, or the like. It is to be noted that terms like "machine", "device", "computing device", "computer", "computing system", and the like, are used interchangeably and synonymously throughout this document.

Figure 2:
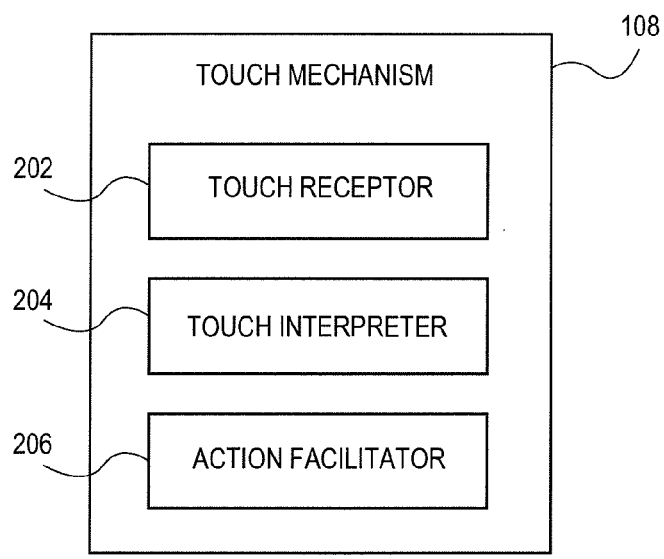
FIG. 2 illustrates a touch mechanism to facilitate interpretation of touch to a pad cover placed over a sensor pad of the computing device according to one embodiment of the invention.

FIG. 2 illustrates a touch mechanism 108 to facilitate interpretation of touch to a pad cover placed over a sensor pad of the computing device according to one embodiment of the invention. In one embodiment, touch mechanism 108 includes a touch receptor 202 that is used to receive or sense the human touch of the pad cover covering the sensor pad. Touch receptor 202 uses various techniques, such as using intersection points caused by conductive lines belonging to the touch panel and the sensor pad of the computing system along with the pressure being put on a flex region between the pad cover and the sensor pad, to receive the user touch. The sensed or received touch is then analyzed and interpreted by a touch interpreter 204 of the touch mechanism 108.

In one embodiment a touch interpreter 204 interprets an intensity of contact as perceived through the pressure applied by pushing on the physical touch pad cover (e.g., plastic cover) as shown in FIG. 1 (as touch pad cover 112) and further described with reference to the subsequent figures. Stated differently, the touch interpreter 204 analyzes and interprets the intensity of contact and the relative pressure may be derived from capacity intensity and any prior knowledge of the touch pad cover (e.g., cover material (such as plastic), flexibility of the material, history of user touches of the touch pad cover, etc.). It is contemplated that pressure comes from the pushing of or on the touch pad cover. Further, the touch pad cover may experience multiple indentations or points of deformation and in such cases, multiple capacities may be interpreted, such as a capacity intensity relating to each point of deformation on the touch pad cover as formed by a corresponding amount of pressure applied to it by a user touch. As aforementioned, interpretation of capacity intensity can determine the amount of pressure applied on the pad cover (using capacitive intensity applied to, for example, the intersection points caused by the pad cover capacitive lines and the touch panel capacitive lines) which can then be used to disclose the nature of the touch, such as whether the touch was a press or a flick or a scroll, or the like. The nature of the touch can help determine the user's intent, such as whether the user intended to press to trigger something on an existing application being displayed on the display screen (e.g., taking a picture using a camera application) or scroll up or down to see the information above or below, respectively, the displayed page, etc.

Once the nature of the touch has been interpreted, the information is forwarded on to an action facilitator 206 of the touch mechanism 108. Action facilitator 206 then facilitates an appropriate action in response to the touch, such as and as aforementioned, trigger something on an existing application being displayed on the display screen or scroll up or down to display the content above or below, respectively, the displayed page, etc.

It is contemplated that any number and type of components may be added to and removed from the touch mechanism 108 to facilitate the workings and operability of the touch mechanism 108 in facilitating interpretation of touch to a pad cover placed over a sensor pad. For brevity, clarity, ease of understanding and to focus on touch mechanism 108, many of the default or known components of a mobile computing device are not shown or discussed here.

Figure 3A:
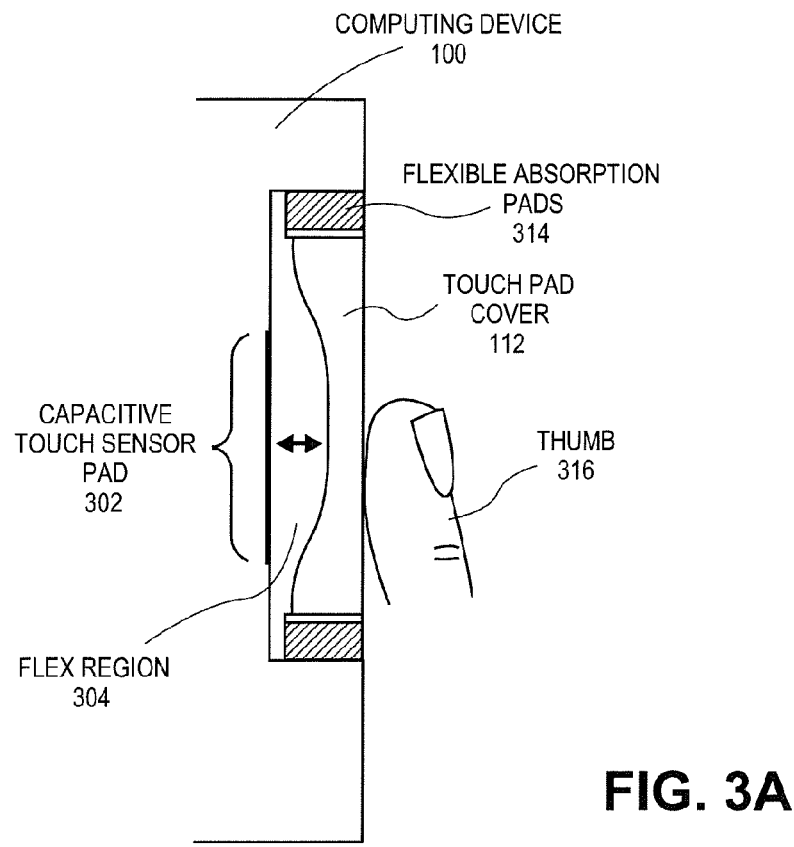
FIG. 3A-3D illustrate placements and functionalities of a pad cover placed over a sensor pad according to one embodiment of the invention.

FIG. 3A illustrates a pad cover 112 covering the sensor pad 302 at a computing device 100 according to one embodiment of the invention. In one embodiment, the pad cover 112 is used to cover the sensor pad 302 such that a flex region 304 (e.g., a free space between the pad cover 112 and the sensor pad 302. The pad cover 112 may be placed such that it is either installed on the area of the computing device 100 that is peripheral to the sensor pad 302 or along the free area at the top and bottom of pad cover 112 using a couple of flexible absorption pads 314 (made with absorption material) on either end of the pad cover 112.

In one embodiment, the human pressure applied on sensor pad 302 using the pad cover 112 and via the flex region 304 is used to detect user intent for touching the pad cover 112. The capacitive intensity of the pressure is calculated by determining the amount of pressure applied to the touch pad cover 112 by measuring the intensity levels of or on one or more intersection points caused by the electronic capacitive wires or lines belonging to each of the sensor pad 302 and the pad cover 112. The capacitive intensity and its sensor readings can vary greatly from person to person and due to changing humidity, battery charge, and the underlying circuit of the computing device 100, etc. In one embodiment, a combination of the material (e.g., plastic) that the pad cover 112 is made of, the unique design of the pad cover 112, the flex region 304, and the first derivative of capacitive intensity, etc., is used to establish multiple distinct levels of pressure (e.g., flick, press, etc.) that can be used to determine the user intent. For example, multiple distinct levels of pressure may include a "press" to unlock the computing device 100, a "click" to take a picture using a camera application, a "slide" to scroll the contents displayed on the screen, or the like. For example, when using a smartphone camera, a user may "press and hold" the pad cover 112 for focusing or exposure settings, etc., and may then release and "press" to take the picture. Using the touch mechanism of FIGS. 1-2, these distinct touches or presses are analyzed and interpreted using their capacitive intensity to establish their levels (without having to employ or use a physical spring or a mechanical button, etc.) and, accordingly, perform the appropriate acts (e.g., taking a picture).

Figure 3B:
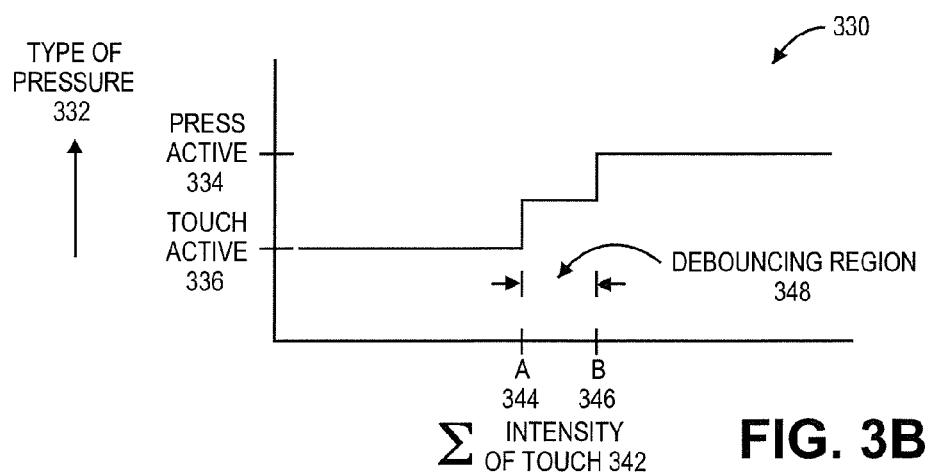

Referring to FIG. 3B, it graphically reflects the aforementioned various levels of capacitive intensity according to one embodiment of the invention. The illustrated capacity level graph 330 illustrates, on the y-axis, types of pressure 332 applied by the user, such as a touch 336 and a press 334. On the x-axis, the graph 330 reflects various intensities 342 in response to the types of pressure 332 applied to the pad cover 112. For example, a mere touch 336 on the pad cover 112 can activate the sensor pad 302 at level A 344 as interpreted by the touch mechanism of the computing device 100. Similarly, a little harder press 334 on the pad cover 112 may result in the intensity level of B 346 as reflected by a slightly higher graph at that point and after a debouncing region 348. These intensity levels 344, 346 corresponding to the pressures 334, 336 are used by the touch mechanism to facilitate the computing device to perform appropriate actions, such as zooming in or out in response to the touch 336 or clicking the camera for a picture in response to the press 334, or the like.

Referring back to FIG. 3A, the touch pad cover 112, made with any number of materials, such as plastic, is placed over the capacitive touch sensor pad 302 such that the cover provided by the pad cover 112 leaves an area (e.g., the flex region 304) in between the sensor pad 302 and the pad cover 112. As illustrated, for example, this flex region 304 may be an arched-type air gap underneath the center with increased thickness on the edges. Further, the top and the bottom ends of the pad cover 112 may be padded with a pair of flexible absorption pads 314 made with a motion absorbing material to maintain the snug under and during flexible as well as un-flexible conditions. Any human contact (e.g., touch by a human thumb 316) with the pad cover 112 may be sensed through the pad cover material (e.g., plastic) and an equalizer may be used to linearize the non-uniform dielectric of the pad cover 112. This technique may be used for any number touches on the pad cover 112, such as a point, a scroll, or any other gesture over the sensor pad 302.

Any touch of the pad cover 112 presses and deforms the pad cover 112 towards and coming in closer contact with the capacitive sensor pad 302. This abrupt change in the intensity between, for example, allows the pressure of the touch to be recognized, such as a press as opposed to a scroll, etc., by the touch mechanism which forms a unique message and ultimately facilitates an appropriate action in response to the interpreted touch. A shown in FIG. 3B, there is debouncing region 348 between thresholds associated the scroll touch 336 and the press touch 334 to maintain stability and their levels A 344, B 346 are monitored for changing environmental and device conditions.

Figure 3C:
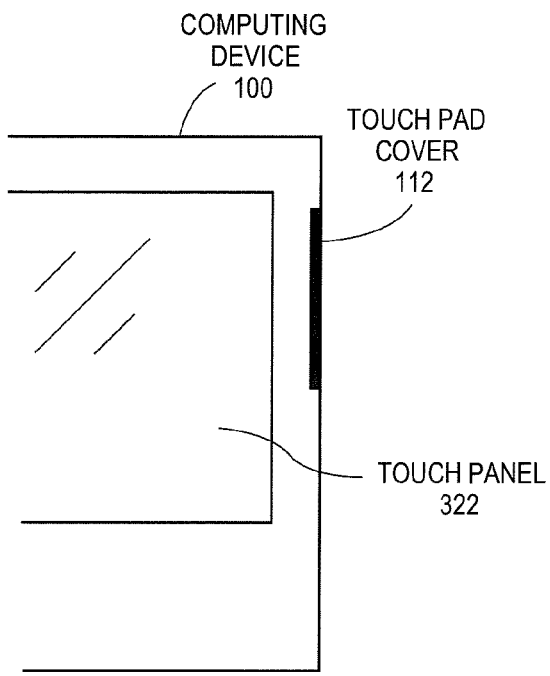
Figure 3D:
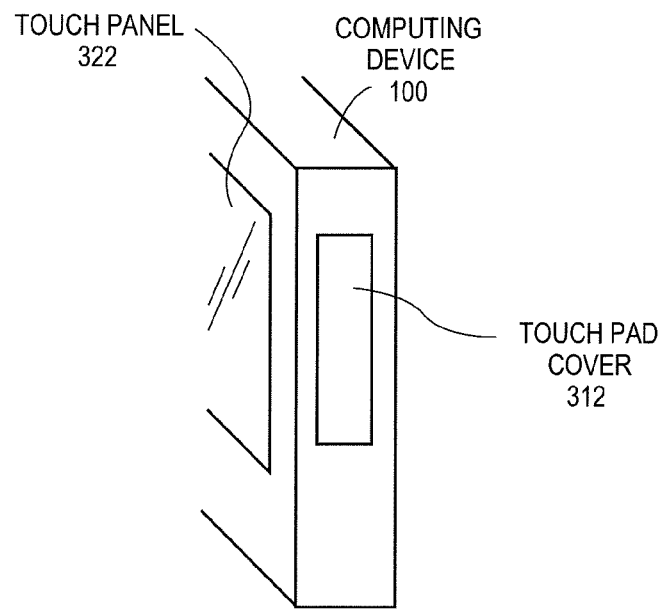

FIG. 3C illustrates the front of the computing device 100 showing a touch panel 322 (e.g., touch pad, display screen) and a touch pad cover 112 on the right side of the computing device 100 to cover touch sensor pad 302 of FIG. 3A. FIG. 3D illustrates a side view of the computing device 100 showing the touch panel 322 and a front view of the rectangular-shaped pad cover 112. It is contemplated that the pad cover 112 is not limited to be made from plastic and that any other form of non-conducting material (e.g., soft aluminum) may be used. Similarly, the pad cover 112 is not limited to the shape or location shown here. For example, the pad cover 112 may be located anywhere (e.g., left side, etc.) of the computing device 100 and be of any particular shape (e.g., oval, etc.). Further, the pad cover 112 may be placed or glued to the peripheral area of the sensor pad 302.

Figure 4:
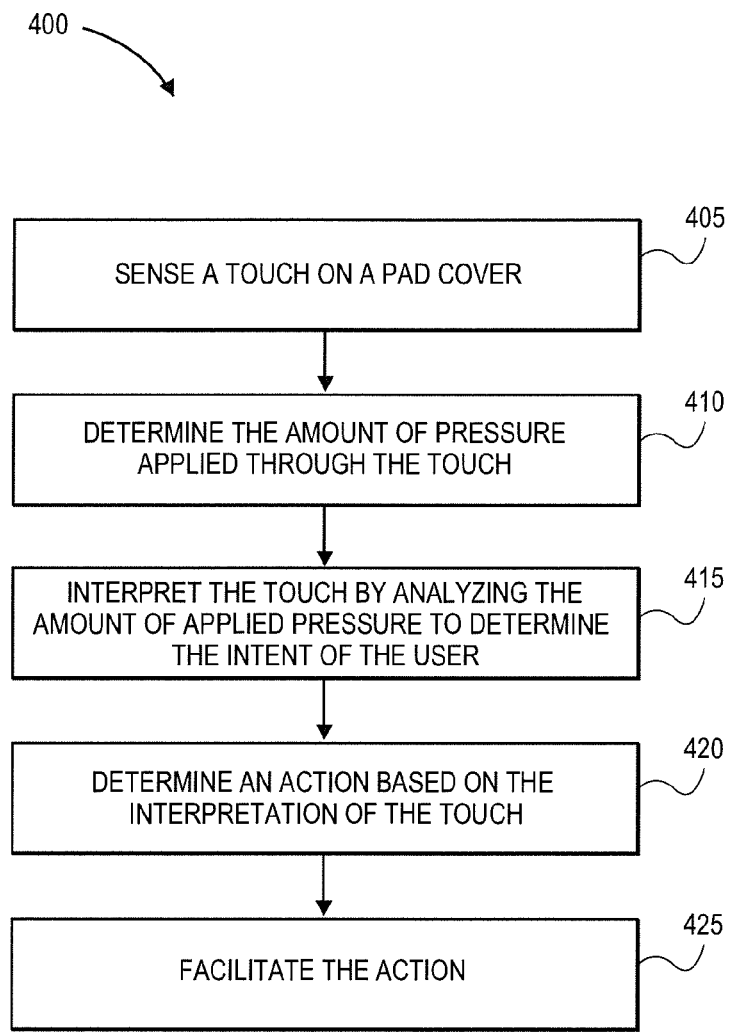
FIG. 4 illustrates a method for employing and facilitating a pad cover over a sensor pad of a computing device according to one embodiment.

FIG. 4 illustrates a method 400 for employing and facilitating a pad cover over a sensor pad of a computing device according to one embodiment. Method 400 may be performed by any number of manufacturing techniques and equipment having processing logic that may comprise hardware (e.g., circuitry, dedicated logic, programmable logic, etc.), software (such as instructions run on a processing device), or a combination thereof. In one embodiment, method 400 may be performed by the touch mechanism of FIG. 1.

Method 400 starts at processing block 405 with the touch mechanism sensing a touch on a pad cover covering a sensor pad of a computing device. At block 410, a determination is made as to how much pressure was applied through the touch; for example, how much dent was made on to the pad cover. Each time the pad cover is touched in anyway, it dents accordingly and gets closer to the sensor pad within the flex region between the pad cover and the sensor pad. At block 415, the amount of sensor signal intensity is measured and mapped to the corresponding pressure applied on the touch pad cover. The pressure is analyzed, according to FIG. 3B, to interpret the touch which then determines the user's intent or intended purpose of using the touch pad cover. For example, if the pressure is slight, the touch may be interpreted as merely a flick or a scroll to scroll the screen up or down, but if the pressure is relatively great, the touch may be interpreted as a press, such as to click a smartphone camera for taking pictures.

At block 420, an appropriate action (e.g., scrolling the content, clicking the camera, opening an address contact, etc.) is determined by the touch mechanism based on the interpretation of the touch. At block 425, the determined action is carried out.

Figure 5:
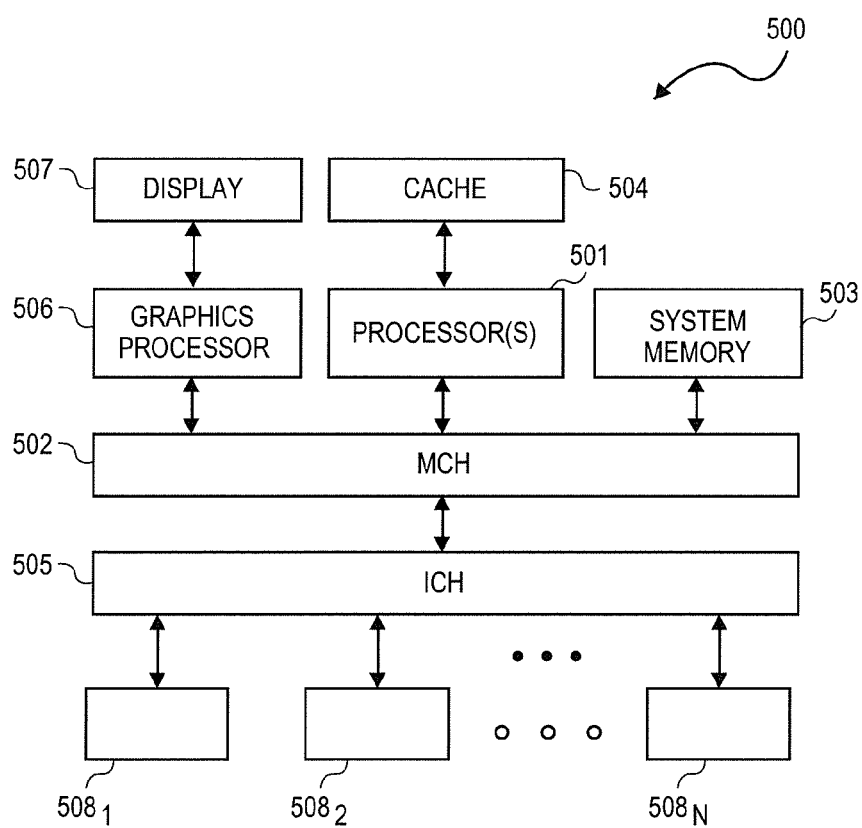
FIG. 5 illustrates a computing system according to one embodiment of the invention.

FIG. 5 illustrates a computing system 500 employing and facilitating a pad cover over a sensor pad according to one embodiment of the invention. The exemplary computing system 500 may be the same as or similar to the computing device 100 of FIG. 1 and include: 1) one or more processors 501 at least one of which may include features described above; 2) a memory control hub (MCH) 502; 3) a system memory 503 (of which different types exist such as double data rate RAM (DDR RAM), extended data output RAM (EDO RAM) etc.); 4) a cache 504; 5) an input/output (I/O) control hub (ICH) 505; 6) a graphics processor 506; 7) a display/screen 507 (of which different types exist such as Cathode Ray Tube (CRT), Thin Film Transistor (TFT), Light Emitting Diode (LED), Molecular Organic LED (MOLED), Liquid Crystal Display (LCD), Digital Light Projector (DLP), etc.; and 8) one or more I/O devices 508.

The one or more processors 501 execute instructions in order to perform whatever software routines the computing system implements. The instructions frequently involve some sort of operation performed upon data. Both data and instructions are stored in system memory 503 and cache 504. Cache 504 is typically designed to have shorter latency times than system memory 503. For example, cache 504 might be integrated onto the same silicon chip(s) as the processor(s) and/or constructed with faster static RAM (SRAM) cells whilst system memory 503 might be constructed with slower dynamic RAM (DRAM) cells. By tending to store more frequently used instructions and data in the cache 504 as opposed to the system memory 503, the overall performance efficiency of the computing system improves.

System memory 503 is deliberately made available to other components within the computing system. For example, the data received from various interfaces to the computing system (e.g., keyboard and mouse, printer port, Local Area Network (LAN) port, modem port, etc.) or retrieved from an internal storage element of the computer system (e.g., hard disk drive) are often temporarily queued into system memory 503 prior to their being operated upon by the one or more processor(s) 501 in the implementation of a software program. Similarly, data that a software program determines should be sent from the computing system to an outside entity through one of the computing system interfaces, or stored into an internal storage element, is often temporarily queued in system memory 503 prior to its being transmitted or stored.

The ICH 505 is responsible for ensuring that such data is properly passed between the system memory 503 and its appropriate corresponding computing system interface (and internal storage device if the computing system is so designed). The MCH 502 is responsible for managing the various contending requests for system memory 503 accesses amongst the processor(s) 501, interfaces and internal storage elements that may proximately arise in time with respect to one another. In one embodiment, the MCH 502 and ICH 505 may not be separately employed; but rather, be provided as part of a chipset that includes the MCH 502, ICH 505, other controller hubs, and the like.

One or more I/O devices 508 are also implemented in a typical computing system. I/O devices generally are responsible for transferring data to and/or from the computing system (e.g., a networking adapter); or, for large scale non-volatile storage within the computing system (e.g., hard disk drive). ICH 505 has bi-directional point-to-point links between itself and the observed I/O devices 508.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

We claim:

1. A computer-implemented method comprising:
   sensing multiple touches of a user on a pad cover covering a capacitive sensor of a computing device, wherein sensing further comprises determining a capacitive intensity that corresponds to an amount of pressure applied to the pad cover via each of the touches, wherein the touches result in overlapping amounts of pressure applied to the pad cover causing multiple points of deformation on the pad cover;
   interpreting capacitive intensities associated with the touches as measured by the capacitive sensor across a pad cover gap of the pad cover associated with the capacitive intensities to conclude a user intent being a dominant user intent of the user intents, wherein interpreting is based on analyzing each of the points of deformation against the rest of the points of deformation based on a history of the touches including a prior knowledge of one or more of the touches by the user, wherein each point of deformation is further analyzed against the rest of the points of deformation based on a type of material of the pad cover and a prior knowledge of flexibility associated with the material of the pad cover; and
   facilitating an action in accordance with the user intent.

2. The computer-implemented method of claim 1, wherein the type of material comprises a conductive material comprising plastic, wherein the flexibility includes a range of flexibility associated with the conductive material used to form the pad cover, wherein the prior knowledge includes a tracked history of the one or more touches made by the user on the pad cover and one or more user intents historically derived from the one or more touches, wherein each point of deformation is further analyzed against the rest of the points of deformation based on a nature of each of the touches.

3. The computer-implemented method of claim 1, wherein the capacitive sensor comprises a thumb sensor externally placed to a side of the computing device, wherein the capacitive sensor is used when the pad cover covering the sensor is touched using one or more of a user finger or a user thumb.

4. The computer-implemented method of claim 1, wherein the nature of the touch comprises one or more of a flick, a scroll, and a press.

5. The computer-implemented method of claim 1, wherein the computing device comprises a mobile computing device comprising one or more of a smartphone, a handheld computing device, a tablet computing device, and an e-reader, wherein the computing device further comprises one or more of a notebook, a netbook, and a desktop computing device.

6. A non-transitory machine-readable medium comprising instructions that, when executed by a machine, cause the machine to:
   sense multiple touches of a user on a pad cover covering a capacitive sensor of a computing device, wherein sensing further comprises determining a capacitive intensity that corresponds to an amount of pressure applied to the pad cover via each of the touches, wherein the touches result in overlapping amounts of pressure applied to the pad cover causing multiple points of deformation on the pad cover;
   interpret capacitive intensities associated with the touches as measured by the capacitive sensor across a pad cover gap of the pad cover associated with the capacitive intensities to conclude a user intent being a dominant user intent of the user intents, wherein interpreting is based on analyzing each of the points of deformation against the rest of the points of deformation and based on a history of the touches including a prior knowledge of one or more of the touches by the user, wherein each point of deformation is further analyzed against the rest of the points of deformation based on a type of material of the pad cover and a prior knowledge of flexibility associated with the material of the pad cover; and
   facilitate an action in accordance with the user intent.

7. The non-transitory machine-readable medium of claim 6, wherein the type of material comprises a conductive material comprising plastic, wherein the flexibility includes a range of flexibility associated with the conductive material used to form the pad cover, wherein the prior knowledge includes a tracked history of the one or more touches made by the user on the pad cover and one or more user intents historically derived from the one or more touches, wherein each point of deformation is further analyzed against the rest of the points of deformation based on a nature of each of the touches.

8. The non-transitory machine-readable medium of claim 6, wherein the capacitive sensor comprises a thumb sensor externally placed to a side of the computing device, wherein the capacitive sensor is used when the pad cover covering the sensor is touched using one or more of a user finger or a user thumb.

9. The non-transitory machine-readable medium of claim 6, wherein the nature of the touch comprises one or more of a flick, a scroll, and a press.

10. The non-transitory machine-readable medium of claim 6, wherein the computing device comprises a mobile computing device comprising one or more of a smartphone, a handheld computing device, a tablet computing device, and an e-reader, wherein the computing device further comprises one or more of a notebook, a netbook, and a desktop computing device.

11. An apparatus comprising:
   a touch receptor to sense multiple touches of a user on a pad cover covering a capacitive sensor of a computing device, wherein sensing further comprises determining a capacitive intensity that corresponds to an amount of pressure applied to the pad cover via each of the touches, wherein the touches result in overlapping amounts of pressure applied to the pad cover causing multiple points of deformation on the pad cover;

a touch interpreter to interpret capacitive intensities associated with the touches as measured by the capacitive sensor across a pad cover gap of the pad cover associated with the capacitive intensities to conclude a user intent being a dominant user intent of the user intents, wherein interpreting is based on analyzing each of the points of deformation against the rest of the points of deformation and based on a history of the touches including a prior knowledge of one or more of the touches by the user, wherein each point of deformation is further analyzed against the rest of the points of deformation based on a type of material of the pad cover and a prior knowledge of flexibility associated with the material of the pad cover; and an action facilitator to facilitate an action in accordance with the user intent.

12. The apparatus of claim 11, wherein the type of material comprises a conductive material comprising plastic, wherein the flexibility includes a range of flexibility associated with the conductive material used to form the pad cover, wherein the prior knowledge includes a tracked history of the one or more touches made by the user on the pad cover and one or more user intents historically derived from the one or more touches, wherein each point of deformation is further analyzed against the rest of the points of deformation based on a nature of each of the touches.

13. The apparatus of claim 11, wherein the capacitive sensor comprises a thumb sensor externally placed to a side of the computing device, wherein the capacitive sensor is used when the pad cover covering the sensor is touched using one or more of a user finger or a user thumb.

14. The apparatus of claim 11, wherein the nature of the touch comprises one or more of a flick, a scroll, and a press.

15. The apparatus of claim 11, wherein the computing device comprises a mobile computing device comprising one or more of a smartphone, a handheld computing device, a tablet computing device, and an e-reader, wherein the computing device further comprises one or more of a notebook, a netbook, and a desktop computing device.

* * * * *